United States Patent [19]

Kumpf et al.

[11] 4,011,132
[45] Mar. 8, 1977

[54] NUCLEAR REACTOR PRESSURE VESSEL FOR NUCLEAR REACTORS WITH PLASTICALLY DEFORMABLE SPACERS

[75] Inventors: Hermann Kumpf, Wendelstein; Gottfried Molz, Erlangen, both of Germany

[73] Assignee: Kraftwerk Union Aktiengesellschaft, Mulheim (Ruhr), Germany

[22] Filed: Jan. 22, 1975

[21] Appl. No.: 543,136

[30] Foreign Application Priority Data

Jan. 29, 1974 Germany .................... 2404171

[52] U.S. Cl. .................... 176/38; 176/87; 176/DIG. 2
[51] Int. Cl.² .................... G21C 9/00
[58] Field of Search ............ 176/37, 38, 87, DIG. 2

[56] References Cited

UNITED STATES PATENTS

| 663,961 | 12/1900 | Donaldson | 89/36 A |
|---|---|---|---|
| 2,773,459 | 12/1956 | Sechy | 176/87 X |
| 3,129,836 | 4/1964 | Frevel | 176/87 |
| 3,288,998 | 11/1966 | Press, Jr. | 176/87 X |
| 3,438,430 | 4/1969 | Kestemont | 176/87 X |
| 3,850,795 | 11/1974 | Thome | 176/87 X |
| 3,907,151 | 9/1975 | Gilden | 176/87 X |

FOREIGN PATENTS OR APPLICATIONS 1,230,137 8/1966 Germany .................... 176/87

Primary Examiner—Samuel W. Engle
Assistant Examiner—Peter A. Nelson
Attorney, Agent, or Firm—Herbert L. Lerner

[57] ABSTRACT

Cylindrical pressure vessel structure for nuclear reactors comprises a steel pressure vessel adapted to receive therein a pressurizing medium, a concrete enclosure at least partly producible in situ, the steel pressure vessel being mounted within the concrete enclosure and, in unheated and unpressurized condition, being radially and axially spaced from the concrete enclosure, and a supporting and insulating layer secured in the radially extending space between the steel pressure vessel and the concrete enclosure, the steel pressure vessel, during operating condition thereof wherein the steel pressure vessel is heated and pressurized, being expansible so as to bear through the supporting and insulating layer against the concrete enclosure, the supporting and insulating layer having support plates on the side thereof adjacent the steel pressure vessel, spacer members connected with the support plates and projecting beyond the surface of the support plates in direction toward the steel pressure vessel, the spacer members being yieldable to a predetermined force for a given radial distance corresponding substantially to an intermediate space between the supporting and insulating layer and the steel pressure vessel.

6 Claims, 8 Drawing Figures

NUCLEAR REACTOR PRESSURE VESSEL FOR NUCLEAR REACTORS WITH PLASTICALLY DEFORMABLE SPACERS

The invention relates to pressure vessels for nuclear reactors with concrete enclosures.

Nuclear reactors must be provided with pressure vessels that are resistant to high temperatures. Starting from a given reactor output, steel vessels must be provided with very thick walls and, because of their size or thickness, are also too heavy to transport. For these reasons, it has been proposed heretofore, to produce pressure vessels for nuclear reactors out of concrete.

In such pressure vessel structures, insulation is disposed between the inner surface of the concrete enclosure and the inner vessel. The thermal insulation layer may be located outside at the thick skin. This offers the advantage that the primary medium contained within the vessel does not leak out, so that a given freedom in the choice of insulation material therefore exists. Problems are presented, however, with the so-called "hot" thick skin which, when formed of multi-layered sheets, are subjected, because of the high temperatures, to compressive stresses which greatly exceed the yield point or stretching-strain limit of the material. Upon re-cooling, this can result especially in cracks and breaks in the material and consequently in perviousness or leakage.

In co-pending application Ser. No. 516,601, filed Oct. 21, 1974, which is a continuation of application Ser. No. 352,265, filed Apr. 18, 1973, abandoned, and which is assigned to the same assignee as that of the instant application, a pressure vessel structure is described wherein the thermal insulating layer is located outside the layer for sealing the pressure vessel (tight skin) and, nevertheless, stressing of the tight skin is held below the stretch limit or yield point. This is essentially achieved through the use of a steel vessel which is disposed in a concrete enclosure and which, during operating condition i.e. at accordingly increased temperature and increased inner pressure, abuts against the concrete enclosure. Such a pressure vessel structure is illustrated in principle in FIG. 1 of the instant application and is described hereinafter in greater detail.

It is an object of the invention of the instant application to provide a pressure vessel structure for nuclear reactors with concrete enclosures which is improved over that of the aforementioned copending application.

More specifically, it is an object of the invention to provide such a pressure vessel structure with a simplified and operationally reliable supporting and insulating means with which accurate adjustment in radial direction of the intermediate space between the steel vessel and the concrete structure is possible.

With the foregoing and other objects in view, there is provided, in accordance with the invention, cylindrical pressure vessel structure for nuclear reactors comprising a steel pressure vessel adapted to receive therein a pressurizing medium, a concrete enclosure at least partly producible in situ, said steel pressure vessel being mounted within the concrete enclosure and in unheated and unpressurized condition, being radially and axially spaced from the concrete enclosure, and a supporting and insulating layer secured in the radially extending space between the steel pressure vessel and the concrete enclosure, the steel pressure vessel, during operating condition thereof wherein the steel pressure vessel is heated and pressurized, being expansible so as to bear through the supporting and insulating layer against the concrete enclosure, the supporting and insulating layer having support plates on the side thereof adjacent the steel pressure vessel, spacer members connected with the support plates and projecting beyond the surface of the support plates in direction toward the steel pressure vessel, the spacer members being yieldable to a predetermined force for a given radial distance corresponding substantially to an intermediate space between the supporting and insulating layer and the steel pressure vessel.

In accordance with the invention, the predetermined force to which the spacer members are yieldable for the given radial distance is a force which exceeds that which is produced during the in situ production of the concrete enclosure forming the supporting and insulating layer.

Other features which are considered as characteristic for the invention are set forth in the appended claims.

Although the invention is illustrated and described herein as embodied in a pressure vessel for nuclear reactors with concrete enclosures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a vertical sectional view of a pressure vessel or tank for nuclear reactors having a concrete enclosure and constructed in accordance with the prior art as disclosed in co-pending application Ser. No. 516,601, filed Oct. 21, 1974, which is a continuation of application Ser. No. 352,265, filed Apr. 18, 1973;

Figure 1:
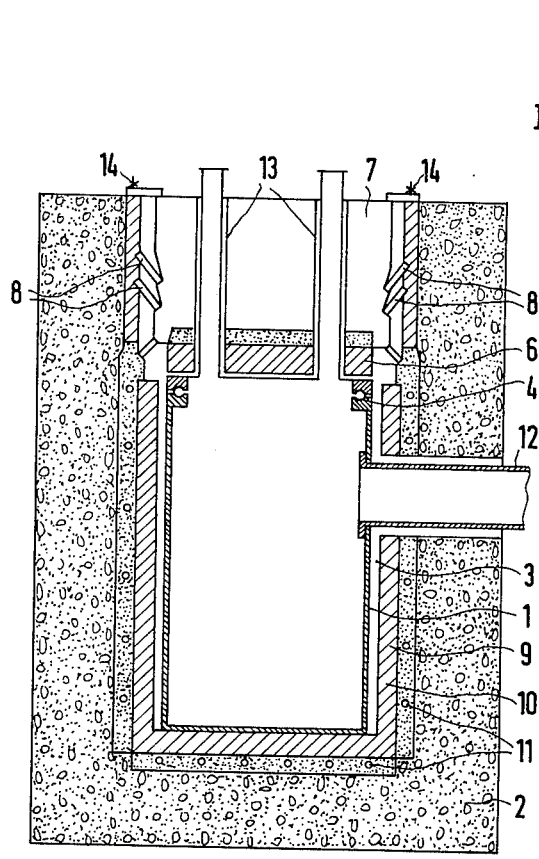

Referring now to the drawing, and first particularly to FIG. 1 thereof, the prior art embodiment of the pressure vessel or tank structure of copending application Ser. No. 516,601, filed Oct. 21, 1974, as a continuation of application Ser. No. 352,265, filed Apr. 18, 1973 is shown therein and includes a steel vessel 1 disposed in the interior of a concrete enclosure 2. The wall thickness of the steel vessel is such that it can withstand part of the operating pressure subsequently instituted. The steel vessel 1 is received in a pre-stressed concrete vessel or enclosure 2 closed by a concrete cover 7, with an intermediate space 3 formed radially between the steel vessel 1 and the concrete enclosure 2, and an expansion clearance 4 located axially therebetween. The concrete cover 7 is formed with openings or passageways 13, for example for control rod drives or nuclear instrumentation and support screws 14 for prestressing a multiple knuckle lock 8 which serves to transmit compressive forces from the concrete cover 7 to the concrete enclosure or vessel 2. The steel vessel 1 has a cover 6 which is connected to the concrete cover 7 and is liftable in common with the latter. If the number of openings or passageways 13 formed in the concrete cover 7 is low, an assemblable disconnection of the steel cover 6 and the concrete cover 7 may be effected.

The steel vessel 1 is surrounded by a thermal insulating layer 9 which abuts against the concrete enclosure 2 through a layer of lean concrete 10 into which cooling tubes 11 are introduced. A lateral connecting pipe 12 to the steel vessel 1 is also shown in the sectional view of FIG. 1.

With this heretofore known device of the aforementioned copending application, at the start of operation of the pressure vessel, initially a pressure up to an order of magnitude of one-third the nominal pressure in the vessel can be set immediately or in stages. The steel vessel 1 thereby expands. If the interior of the pressure vessel is then heated, the wall of the steel vessel 1 engages the thermal insulation layer 9 and abuts the concrete enclosure 2 through the thermal insulation layer 9 and the layer of lean concrete 10. The thermal insulation layer 9 thus acts simultaneously as protective layer for the support or bracing of the steel vessel 1 against the wall of the concrete enclosure 2. At this instant, the wall of the steel vessel 1 remains stressed in tension. With further increase of pressure and temperature in the interior of the pressure vessel, the steel vessel vainly seeks to expand further. The result thereof is that the tensile stress in the wall of the steel vessel 1 continuously becomes smaller and, by selecting the intermediate spaces 3 and 4 of suitable size, is transformed into a compressive stress. Through the selection of the size of the intermediate spaces 3 and 4, the selection of the stressing of the steel vessel 1 in the operating condition of the pressure vessel is accordingly made available.

Upon the increase of temperature in the steel vessel, the latter will not only engage the thermal insulation sheet 9 but also will be shifted, upwardly from below in an increasing extent, to the thermal insulation sheet 9. In addition to the accurate maintenance of the intermediate spaces 3 in radial and the intermediate space 4 in axial direction, assurance must therefore be provided that the least possible frictional forces will exist between the thermal insulation layer 9 and the steel vessel 1.

Figure 2:
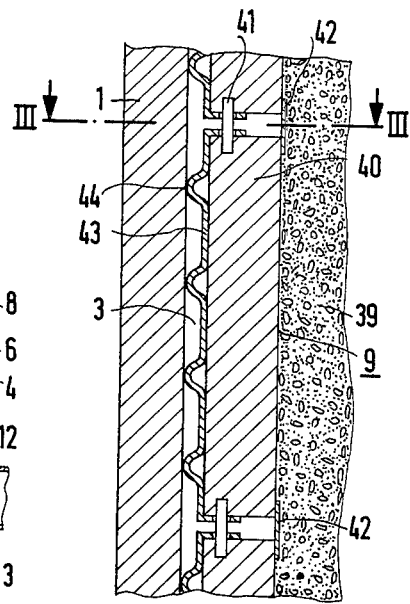
FIG. 2 is an enlarged fragmentary vertical sectional view of a modified form of the pressure vessel structure of FIG. 1.
Figure 3:
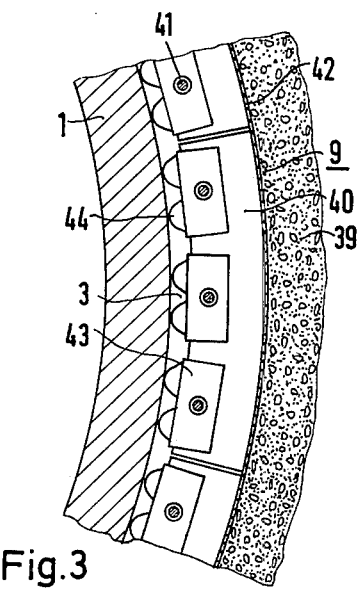
FIG. 3 is a fragmentary cross-sectional view of FIG. 2 taken along the line III—III in the direction of the arrows.

In an embodiment of the invention of the instant application illustrated in the sectional views of FIGS. 2 and 3, the thermal insulation layer 9 is shown completely reinforced by concrete and with the steel vessel 1 not yet expanded, that is, before initial start-up of the operation of the pressure vessel. The thermal insulation layer 9 in the embodiment of FIGS. 2 and 3 is formed of insulating concrete 39, the inner limit of which is bounded by a support plate 40. A multiplicity of these support plates 40, spaced one from the other, are provided at the periphery of the concrete enclosure 39. Pins 41 hold the support plates 40 together, and cover strips 42 prevent ingress of concrete into the spaces between the support plates 40. To insure the production of a radial space 3 between the steel vessel 1 and the thermal insulation layer 9, which includes the support plates 40 and the concrete enclosure 39, sheet-metal strips 43 are connected to the support plates 40. The sheet-metal strips 43 are formed with projections 44. Moreover, the sheet-metal strips 43 are of such dimensions that when pouring the insulation concrete 39, the projections 44 do not deform, whereas during start-up of the operation of the steel vessel 1, the projections 44 become compressed due to the pressure forming in the interior of the steel vessel 1 and due to the inner temperature of the projections 44. After the initial start-up, that is, in the cold nonpressurized condition, there is present in radial direction a defined intermediate space 3. In order to facilitate displacement or shifting of the steel vessel 1 with respect to the support plates 40 in vertical direction, it is advantageous to provide the sheet-metal strips 43 with a coating, such as a chromium layer or a layer of lubricant.

Figure 4:
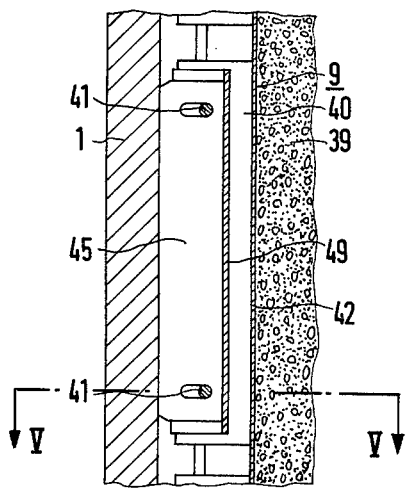
FIG. 4 is a view similar to that of FIG. 2 showing yet another modified form of the support construction of the pressure vessel structure.
Figure 6:
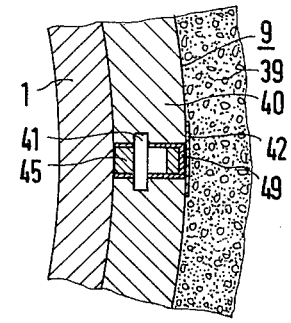
FIG. 6 is a view of part of FIG. 5 during a phase wherein the heated and thus expanded steel vessel abuts the concrete enclosure.
Figure 5:
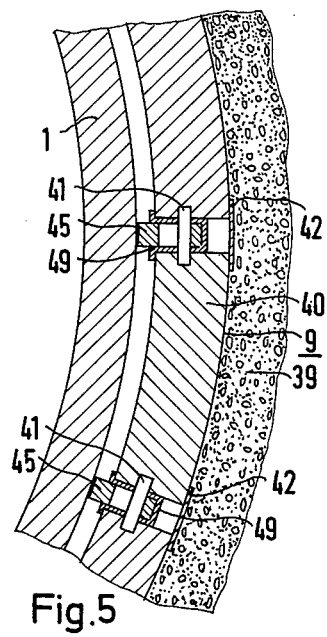
FIG. 5 is a fragmentary cross-sectional view of FIG. 4 taken along the line V—V in the direction of the arrows.

In FIGS. 4 and 5, the thermal insulation layer 9 is again formed of insulation concrete 39 and includes support plates 40. In contrast to the embodiment of FIGS. 2 and 3, spacer members 45 extending vertically and radially are provided in the embodiment of FIGS. 4 and 5 between the support plates 40, the spacer members 45 projecting inwardly out of the intermediate space between respective support plates 40 of adjacent pairs thereof and held in U-shaped bent holder sheets 49. The holder sheets 49 are, moreover, formed with elongated holes or slots through which pins 41 extend between the adjacent support plates 40, the holder sheets 49 being readily shiftable in radial direction, however, because of the elongated holes. The holder sheets 49 prevent outward shifting relative to the support plates 40 for forces which do not markedly exceed the concrete pouring force. They are of such dimensions, however, that they are pressed into the intermediate space between two support plates 40 (FIG. 6) due to the very high pressure exerted by the steel vessel 1 upon the support plates 40 during increase of pressure and temperature.

Figure 7A:
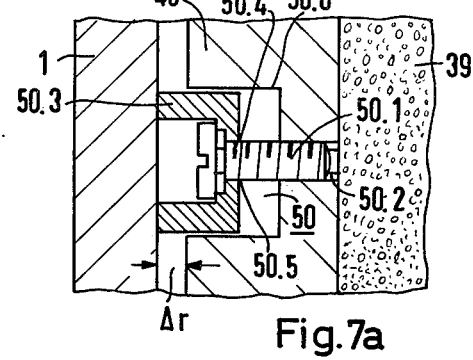
FIG. 7a is a fragmentary enlarged view of FIG. 7 showing in greater detail one of the spacer members diagrammatically illustrated in FIG. 7.
Figure 7:
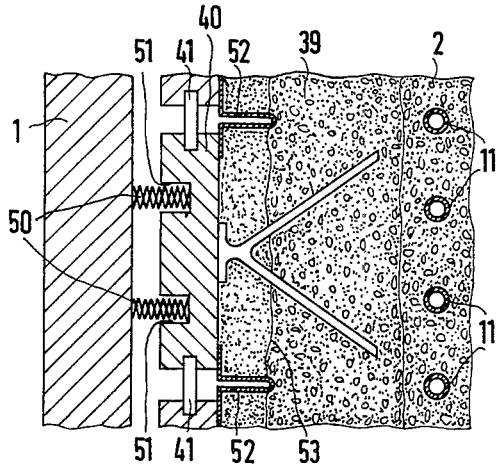
FIG. 7 is a view similar to those of FIG. 2 and 4 showing a further modified form of the support construction during a phase wherein the steel vessel is cold and accordingly unexpanded.

In the embodiment of FIG. 7, shaped spacer members 50 are provided between the steel vessel 1 and the support plates 40. These shaped spacer members 50 are secured in recesses 51 and project inwardly out of the shaped spacer members 50 before start-up of the operation of the steel vessel 1, however, they are forced with plastic deformation into the grooves 51 at the initial start-up. In order to avoid thermal stresses in the insulation concrete 39, instead of sheet-metal strips 42, angle sheets 52 spaced one from the other can be provided, expediently at all of the edges of the support plates 40 in the form of an open box cover. The angle sheets 52 prevent penetration of the concrete into the spaces between the support plates 40 of each pair of adjacent support plates 40. Since these angle sheets 52 are compressible in the clearance or play thereof with respect to the adjacent sheets, thermal stresses in the concrete are in this manner considerably reduced. The dividing line 53 shown in FIG. 7 denotes that a layer of concrete has initially been applied to the outside of the support plates 40, and that the succeeding layer of concrete, after installation of the steel vessel 1 with the support plates 40 fastened at the periphery thereof, is poured between the latter and the concrete enclosure 2. Cooling tubes 11 are provided in the concrete enclosure 2 for removing heat that has passed through the thermal insulation layer 9. The cooling tubes 11 can lie equally well in the outer zone of the layer of insulation concrete 39.

In FIG. 7a, there is shown a practical embodiment for the shaped spacer members 50. In the illustrated embodiment of FIG. 7a, a spacer member 50 is shown as a strong or sturdy screw or bolt 50.1 which is threaded into an internally threaded through-bore 50.2 formed in the support plate 40 and carries a spacer holder 50.3 at the end thereof formed with a head. The spacer holders 50.3 are formed with a threaded bore 50.4 and are carried by or mesh with only a few threads of the screw or bolt 50.1. In the interest of clarity and simplicity, only one carrying or meshing thread of the screw or bolt 50.1 and one thread flank 50.5 of the spacer holder 50.3 is shown in FIG. 7a. Depending upon the stress relationships, more than one thread can be used to carry the spacer holders 50.3. The spacer holders 50.3 may have a hollow cylindrical basic shape or square i.e. cubic, shape, and are, as illustrated in FIG. 7a, substantially of U-shaped cross section. The steel vessel 1 is disposed in cold condition thereof, as illustrated in FIG. 7a, in engagement with the spacer holders 50.3, the space or gap $\Delta r$ being maintained even when concrete is being poured. At start-up of the operation of the steel vessel 1, when the latter heats up and is subjected to an inner pressure, the steel vessel 1 expands radially and axially and the supporting thread flanks 50.4, 50.5 are plastically deformed so that the spacer holders 50.3 are forced by the steel vessel 1 through the distance $\Delta r$ into the recess 50.6.

It is claimed:

1. Cylindrical pressure vessel structure for nuclear reactors comprising a steel pressure vessel adapted to receive therein a pressurizing medium, said steel pressure vessel, during operating condition thereof wherein said steel pressure vessel is heated and pressurized, being expansible, an outer concrete enclosure, said steel pressure vessel being mounted within said outer concrete enclosure in unheated and unpressurized condition and being radially and axially spaced from said outer concrete enclosure, and a supporting and insulating layer secured in the radially extending space between said steel pressure vessel and said outer concrete enclosure in radially spaced-apart relationship to both said steel pressure vessel and said outer concrete enclosure, a layer of concrete interposed in the radial spacing between said supporting and insulating layer and said outer concrete layer, said layer of concrete being produced in situ by solidification of a matrix thereof poured into the radial spacing between said supporting and insulating layer and said outer concrete enclosure, said supporting and insulating layer having support plates on the side thereof adjacent said steel pressure vessel, spacer members connected with said support plates and having projections extending beyond the surface of said support plates in direction toward said steel pressure vessel, said spacer members defining a given radial spacing of said support plates from said pressure vessel, said spacer members being unyieldable against radial forces produced during solidifcation of said layer of concrete interposed in the radial space between said supporting and insulating layer and said outer concrete enclosure, so as to maintain said given radial spacing of said support plates from said pressure vessel, said spacer members being yieldable, however, to radial forces applicable thereto by said expansion of said pressure vessel during said heated and pressurized condition thereof, so that said projections of said spacer members plastically deformed to permit the expanding pressure vessel to expand into the radial spacing between said pressure vessel and said supporting and insulating layer and bear against said outer concrete enclosure through the intermediary of said deformed spacer members, said supporting and insulating layer and said layer of concrete.

2. Cylindrical pressure vessel structure according to claim 1 including respective pins connecting adjacent support plates to one another.

3. Cylindrical pressure vessel structure according to claim 1 wherein said spacer members comprise sheet-metal strips having projections formed therein.

4. Cylindrical pressure vessel structure according to claim 1 wherein said spacer members are disposed between adjacent support plates and project beyond said support plates in radial direction toward said steel pressure vessel, and including U-shaped holder sheets holding said spacer members, respectively, in the space between said adjacent support plates.

5. Cylindrical pressure vessel structure according to claim 1 wherein said support plates are formed with recesses, and said spacer members comprise shaped spacers respectively mounted in said recesses.

6. Cylindrical pressure vessel structure according to claim 5 wherein said shaped spacers comprise U-shaped spacer holders and respective threaded fasteners securing said holders within said recesses.

* * * * *